United States Patent Office 3,248,260
Patented Apr. 26, 1966

3,248,260
INTERPOLYMERS OF N-METHYLOL ACRYL-
AMIDES AND COMPOSITIONS CONTAINING
SAME
Esley Oren Langerak, Wilmington, Jerry Allen Nelson,
Newark, and Everett James Wright, Wilmington, Del.,
assignors to E. I. du Pont de Nemours and Company,
Wilmington, Del., a corporation of Delaware
No Drawing. Filed Aug. 22, 1961, Ser. No. 133,065
11 Claims. (Cl. 117—161)

This application is a continuation-in-part of our application Serial No. 25,885, filed May 2, 1960, and now abandoned, which in turn was a consolidation of our two earlier applications, Serial Nos. 713,300 and 713,306, filed February 5, 1958, both now abandoned.

This invention deals with new compositions of matter and a process of using them to make fibrous materials, particularly textiles, both water repellent and oil repellent. In particular, this invention is concerned with copolymers (or interpolymers) of fluoroalkyl acrylates or methacrylates with methylol acrylamide or methylol methacrylamide and to their application to fibrous materials.

Separately acting water repellents and oil repellents for numerous solid materials have been known for some time, but there have not been commercially available agents which would impart to such materials both wash-fast water repellency and wash-fast oil repellency. Thus, although it has been observed (U.S.P. 2,642,416) that polymers of certain 1,1-dihydroperfluoroalkyl acrylate esters possess the property of being both oleophobic and hydrophobic, these effects when applied to textile materials are usually fugitive to washing or dry-cleaning. It is accordingly an object of this invention to provide novel compositions of matter which will impart both water repellency and oil repellency to fibrous materials, such as textile fibers and paper, and whose effects will be of improved durability to washing procedures, including in this term both laundering and dry cleaning. Another object is to provide said composition in the form of concentrated and stable (therefore, marketable), aqueous emulsions which may be readily diluted with water by the consumer to provide a treatment bath of the desired dilution or strength. Additional objects and achievements of this invention will become apparent as the description proceeds.

Now according to this invention, the above objects are achieved by copolymerizing, preferably by the emulsion technique, a fluoroalkyl ester (A) as defined below with an N-methylol acrylamide (B), that is a compound of the formula $$Q\text{—}NH\text{—}CH_2OH$$

wherein Q represents the acyl radical of acrylic or methacrylic acid, i.e. one of the radicals

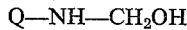

and

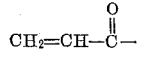

the proportion of component B in the interpolymer being from 0.25 to 5% by weight of the whole. The fluoroalkyl ester constituting component A is an ester of acrylic or methacrylic acid, and may be a compound defined by the following formulas or it may be a mixture of two or more such compounds, namely:

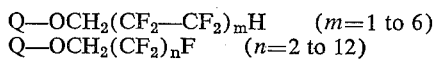

and

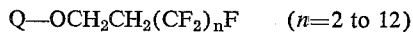

Q having the same meaning as above.

The aqueous emulsion or latex obtained from the above mentioned polymerization may be diluted with water to form a treatment bath which may be applied to fibrous materials such as cotton, wool, nylon, polyester fibers, or paper whereupon the material is squeezed and, preferably after drying, is heated at a temperature between 100° and 150° C. for a period of time varying from 5 minutes to 30 seconds.

The actual formation of our novel interpolymers may follow conventional methods. To avoid continuous repetition, the discussion hereinbelow will generally name only fluoroalkyl acrylates and methylol acrylamide, it being understood that these compounds are typical of both the compounds named and the corresponding fluoroalkyl methacrylates and methylol methacrylamide.

In a preferred process of this invention, the fluoroalkyl acrylate or methacrylate of the above formulas, or a mixture of these fluoroalkyl esters, is emulsified with the desired proportion of N-methylol acrylamide in an aqueous system. The emulsion is heated in the absence of oxygen and in the presence of a free radical generating catalyst (as for example, hydrogen peroxide, benzoyl peroxide, potassium persulfate, 2,2'-azodiisobutyramidine dihydrochloride, etc.) and the mixture is agitated at about 50° C. for a period of from about 4 to 16 hours while polymerization occurs. The resulting latex which is formed is then strained to free it from any undispersed material and the effluent dispersion which contains the dispersed polymer is ready for use. This aqueous latex is a milky dispersion which will normally contain between 20 and 40% by weight of the interpolymer, depending upon the concentration of reactants taken, and may be sold in this form as a commercial product.

The said commercial concentrated latex may be used as a pad bath by diluting it with water to a polymer concentration of 1 to 10% by weight of the bath. The textile material, or paper if desired, is padded in this bath, and is then freed of excess liquid, usually by squeeze rolls, so that the dry pickup (weight of the dry polymer on fiber) is between about 0.5 and 10% by weight of the fiber. The treated material is then heated at 100 to 150° C. for at least about 30 seconds, to impart maximum durability of the agent on the material. The resulting textile material or paper will be found to be resistant to water and to oil and will retain its resistance to such agents even after many launderings or dry cleanings.

If desired, the interpolymer product may be recovered in substance by pouring the above-described aqueous latex into methanol or acetone and filtering off and drying (preferably under vacuum) the precipitated solid.

The polymeric compositions of this invention are solids which are insoluble in water, acetone and methanol. The preferred agents for the purposes of this invention are copolymers which have diverse fluoroalkyl acrylate or methacrylate units in the polymer. Such polymers are obtained by polymerizing N-methylol acrylamide (or N-methylol methacrylamide) with mixtures of fluoroalkyl acrylates or methacrylates as defined above.

Examples of fluoroalkyl esters which may be used to make the copolymers of this invention are:

1H,1H-pentafluoropropyl acrylate,
1H,1H,3H-tetrafluoropropyl methacrylate,
1H,1H-heptafluorobutyl methacrylate,
1H,1H,2H,2H-pentafluorobutyl acrylate,
1H,1H-nonafluoropentyl acrylate,
1H,1H,5H-octafluoropentyl methacrylate,
1H,1H,2H,2H-heptafluoropentyl methacrylate,
1H,1H-tridecafluoroheptyl methacrylate,
1H,1H,7H-dodecafluoroheptyl acrylate,
1H,1H-pentadecafluorooctyl acrylate,
1H,1H,8H-tetradecafluorooctyl methacrylate,
1H,1H,2H,2H-tridecafluorooctyl acrylate, 1H,1H-heptadecafluorononyl methacrylate,
1H,1H,9H-hexadecafluorononyl acrylate,
1H,1H,2H,2H-pentadecafluorononyl methacrylate,
1H,1H,11H-eicosafluorohendecyl methacrylate,
1H,1H-heneicosafluorohendecyl acrylate,
1H,1H-tricosafluorododecyl acrylate,
1H,1H,2H,2H-heneicosafluorododecyl methacrylate,
and mixtures of any two or more thereof.

In general, the repellent effects are better as $n$ increases.

The above fluoroalkyl esters may be prepared by esterifying acrylic or methacrylic acid with one of the polyfluoroalcohols corresponding to the esters hereinabove formulated. These alcohols in turn may be prepared as follows:

The 1H,1H-polyfluoroalcohols are obtained by the reduction of perfluoroalkanoic acids with lithium aluminum hydride as described in U.S.P. 2,666,797. The 1H,1H,ωH-polyfluoroalcohols are prepared by reacting tetrafluoroethylene with methanol as described in U.S.P. 2,559,628. The 1H,1H,2H,2H-polyfluoroalcohols are prepared by reacting a 1-iodopolyfluoroalkane represented by the formula $C_nF_{2n+1}I$ with vinyl acetate and reducing the intermediate acetate addition product with zinc to provide the desired polyfluoroalcohol. The preparation of 1H,1H,2H,2H-pentadecafluoro-1-nonanol is given herewith as an example of this procedure.

*Example 1*

A mixture of an equimolar amount (0.1 gram-mole) of vinyl acetate and 1-iodopentadecafluoroheptane and 0.1 gram of 2,2'-azodiisobutyronitrile is heated under nitrogen with agitation at between 80° and 90° C. for five hours. Then another 0.1 gram portion of 2,2'-azodiisobutyronitrile and a 4.0 g. portion of 1-iodopentadecafluoroheptane are added, and the heating is continued at 75° C. for two hours. The unreacted 1-iodopentadecafluoroheptane is distilled off at 8 mm. pressure and at a pot temperature of 60° C. The resulting liquid residue weighs about 57 g. and is essentially 1H,2H,2H-iodopentadecafluorononyl acetate.

To a solution of 55 g. of this iodopolyfluorononyl acetate in 100 ml. of 95% ethanol are added, at 60° C. and over a period of one hour with rapid stirring, a slurry of 20 g. of zinc dust in 50 ml. of 95% ethanol and 10 ml. of concentrated hydrochloric acid. Two 5 ml. portions of concentrated hydrochloric acid are added during the reaction period to keep the zinc reacting. The mixture is stirred one hour longer, cooled to 25° C., and mixed in a separatory funnel with 100 ml. of cold water. The oily layer (37 g.) is drawn off, and to it is added a chloroform solution of material extracted from the aqueous layer. Distillation of the chloroform up to a temperature of 110° C. leaves 40 g. of product.

This product is heated one hour at 60° C. with 50 ml. of a 10% ethanol solution of potassium hydroxide, drowned in water, and shaken with chloroform three times. The chloroform solution is dried over anhydrous magnesium sulfate, and the chloroform is stripped off. Pure 1H,1H,2H,2H-pentadecafluoro-1-nonanol distills at 84° C. at 10 mm. mercury pressure. It has a refractive index $(N_D^{25})$ of 1.3164.

Similarly other 1H,1H,2H,2H-polyfluoroalcohols are prepared from 1-iodopolyfluoroalkanes and vinyl acetate. The 1H,1H,2H,2H-heptafluoro-1-pentanol boils at 128° C. at 760 mm. and has an $N_D^{25} = 1.3100$.

The padding of textile material or paper with the novel interpolymer emulsions of this invention is preferably carried out from an aqueous bath and under acid conditions, for instance pH 2 to 4.

It has been observed that after washing the treated textile, the repellency values are often much lower than originally. However, it has been found that simply ironing the washed material restores the repellent effect.

Thus, to obtain maximum benefit from these novel agents, the washed fabric should be ironed before use.

The oil- and water-repellent effects are evaluated by known methods:

The test to evaluate water repellency is carried out according to the Standard Spray Method described on page 132 of the 1956 edition of The American Association of Textile Chemists and Colorists Technical Manual and Yearbook.

The test to evaluate oil repellency is based on the different penetrating properties of mineral oil ("Nujol") and n-heptane. Mixtures of these two hydrocarbon liquids, which are miscible in all proportions, show penetrating properties proportional to the amount of n-heptane in the mixture.

To measure oil repellency of a treated fabric, 8" x 8" swatches of the fabric are placed on a table and a drop of the test mixture gently placed onto the fabric surface. After 3 minutes, the wetting and penetration of the fabric is visually observed. From the following table, the number corresponding to that mixture which contains the highest percentage of heptane which does not penetrate or wet the fabric is taken as the oil repellency rating.

| Oil Repellency Rating | Percent by Volume Heptane | Percent by Volume "Nujol" |
|---|---|---|
| 100(+) | 60 | 40. |
| 100 | 50 | 50. |
| 90 | 40 | 60. |
| 80 | 30 | 70. |
| 70 | 20 | 80. |
| 50 | 0 | 100. |
| 0 | | No resistance to "Nujol" (i.e. penetration within 3 minutes). |

Usually, acceptable ratings are 70 and above, although beneficial effect to oil staining is sometimes obtained with ratings as low as 50.

Without limiting this invention, the following additional examples are given to illustrate our preferred mode of operation. Parts mentioned are by weight.

*Example 2*

Two parts of N-methylol acrylamide, 3.5 parts of sodium lauryl alcohol sulfate and 180 parts of boiled water (to rid of oxygen) are homogenized in a colloid mill for 20 seconds. Then 98 parts of 1H,1H-pentadecafluorooctyl acrylate is added and the mixture is homogenized for 3 minutes. The mixture is poured into a vessel equipped with an agitator and is heated to 50° C.; 24 parts of a solution containing 0.8 part of potassium persulfate in 36 parts of boiled water are added and the mixture is agitated for 4 hours with the temperature at 50° C. and under an atmosphere of nitrogen. The remaining 12 parts of potassium persulfate solution are then added, and the polymerization is continued for 12 hours longer. The resulting aqueous suspension containing approximately 30% by weight of the interpolymer has a pH of between 2 and 4 and is directly ready for use.

The interpolymer may be isolated by pouring the above suspension into a large volume of methanol and filtering off the solid product. Analysis shows it to contain 0.23% nitrogen and 61.2% fluorine.

To make a pad bath, the aqueous suspension is diluted with water to a 5% content by weight of the polymer. Cellulosic fabric is dipped into the pad bath and squeezed of excess liquid. The fabric is then dried and heated in an oven at 150° C. for 3 minutes. Fabric treated in this fashion, generally shows a gain in weight of about 4 to 5% (dry pickup), and has an oil repellency rating of 80.

To test the durability of this effect, the treated fabric is washed for 15 minutes with agitation at 70° to 80° C. in an 0.2% solution of a heavy duty, built detergent (Tide): it is then rinsed successively in boiling water and in cold water and dried. The fabric is then ironed at 235° C. In one such test it was found that the oil repellency rating of the fabric remained at 80 through several successive washings and ironings, and dropped only to 70 after the eighth treatment.

A control sample of fabric treated in simliar manner but with a polymer which is 100% 1H,1H-pentadecafluorooctyl acrylate (no methylol acrylamide) exhibits an oil repellency rating of 50 at the end of 3 washes and ironings, and loses essentially all of its repellent effect after 4 washes.

When a piece of wool worsted is padded and heated with the interpolymer of this example in the same manner as the cotton fabric to a 5% pickup, the water- and oil-repellency ratings, after drying and ironing, are 70 each. After dry cleaning with Stoddard's solvent, there is no change in the repellent effects.

An interpolymer prepared as described above from 1H,1H - pentadecafluorooctyl methacrylate and N - methylol-acrylamide exhibits similar water- and oil-repellent effects on cotton and wool fabrics.

*Example 3*

Following the same procedure as given in Example 2, an emulsion containing 1 part of N-methylol acrylamide, 99 parts of 1H,1H-nonadecafluorodecyl acrylate, 3.5 parts of sodium lauryl alcohol sulfate and 180 parts of boiled water is prepared and polymerized, using a solution of 0.8 part of potassium persulfate in 36 parts of boiled water as the initiator.

Evaluation on cotton and wool as in Example 2 except that a 1% pad bath and a 1% pickup was used, gave essentially the same results.

Similarly when 1H,1H,2H,2H-pentadecafluorononyl acrylate or methacrylate is used in place of the 1H,1H-nonadecafluorodecyl acrylate, an interpolymer is obtained which when padded on cotton fabric from its latex imparts to it high water- and oil-repellency.

*Example 4*

Two parts of N-methylol acrylamide, 3.5 parts of sodium lauryl alcohol sulfate and 180 parts of boiled distilled water (to rid of oxygen) were homogenized in a colloid mill for 20 seconds. Then a mixture of 30 parts of 1H,1H,11H-eicosafluorohendecyl acrylate and 68 parts of 1H,1H,7H-dodecafluoroheptyl acrylate was added within one minute and the mixture was homogenized for 3 minutes. The mixture was then poured into a flask equipped with an agitator and heated to 50° C. 24 parts of a solution containing 0.8 part of potassium persulfate in 36 parts of boiled distilled water was added, and the mixture was agitated for 4 hours with the temperature at 50° C. and under an atmosphere of nitrogen. The remaining 12 parts of potassium persulfate solution was then added and the polymerization was continued for 12 hours longer.

The resulting aqueous suspension which had a pH of 2.4 and contained approximately 30% by weight of the interpolymer was divided into several portions. From one portion, the interpolymer was isolated by pouring the suspension into a large volume of methanol and filtering off the solid product. Analysis showed it to contain 0.30% nitrogen; the calculated nitrogen value for the interpolymer is 0.28%.

Another portion of said aqueous suspension was strained from a small amount of solid material, and was diluted with water to make a pad bath containing 5% by weight of the polymer. The polymer was padded onto cellulosic fabric by dipping the fabric into the pad bath and expressing the excess liquid. The fabric was then dried and heated in an oven at 150° C. for 3 minutes. Its gain in weight was 3.2%, and it was found to have an oil repellency rating of 80 and a water spray rating of 70.

The treated fabric was washed for 15 minutes with agitation at 70° to 80° C. in an 0.2% solution of a heavy duty, built detergent (Tide); it was then rinsed successively in boiling water and in cold water and dried. The fabric was then ironed at 235° C. After one such washing and ironing, the oil repellency rating was 70, and it remained at 70 through 14 successive washings and ironings.

A control sample in which the interpolymer was 30% 1H,1H,11H - eicosafluorohendecyl acrylate and 70% 1H,1H,7H-dodecafluoroheptyl acrylate (but no methylol acrylamide) lost most of its repellent effect after 10 washes, and 46% of the agent on the fiber had been removed by washing.

*Example 5*

Following the same procedure given in Example 4, an emulsion containing 2 parts of N-methylol acrylamide, 30 parts of 1H,1H,11H-eicosafluorohendecyl acrylate, 68 parts of 1H,1H,5H-octafluoropentyl acrylate, 3.5 parts of sodium lauryl alcohol sulfate and 180 parts of boiled distilled water was prepared and polymerized, using a solution of 0.8 part of potassium persulfate in 36 parts of boiled distilled water as the initiator. Cotton fabrics treated in the manner described in Example 4 had an oil repellency rating of 80 and a spray rating of 70. After 10 successive washings, the oil repellency was 70 and the spray rating was 70.

A piece of filter paper was padded with an aqueous latex containing 5% by weight of the above polymer to a dry pickup of 5.2%. The treated paper was dried at 150° C. for 2 minutes, and showed an oil repellent rating of 90. The paper also showed good water repellency.

When methacrylate esters of the perfluoro-alcohols are used in place of the above acrylate esters, similar water- and oil-repellency effects are obtained.

*Example 6*

Following the same procedure given in Example 4, an emulsion containing 0.5 part of N-methylol acrylamide, 69.5 parts of 1H,1H,7H-dodecafluoroheptyl acrylate, 30 parts of 1H,1H,11H-eicosafluorohendecyl acrylate, 3.5 parts of sodium lauryl alcohol sulfate and 180 parts of boiled distilled water was prepared and polymerized, using a solution of 0.8 part of potassium persulfate in 36 parts of boiled distilled water as the initiator. The interpolymer product contained 0.10% by weight of nitrogen, which corresponds to 0.4% by weight of N-methylol acrylamide in the polymer. Cotton fabrics treated with this polymer in the same manner as described in Example 4 had good oil and water repellency properties. After 3 successive washings and subsequent ironings the oil and water repellency properties were essentially the same as before the washing.

*Example 7*

Following the same procedure given in Example 4, an emulsion containing 2 parts of N-methylol acrylamide, 98 parts of 1H,1H,9H-hexadecafluorononyl acrylate, 3.5 parts sodium lauryl alcohol sulfate and 180 parts of boiled distilled water was prepared and polymerized, using a solution of 0.8 part of potassium persulfate in 36 parts of boiled distilled water as the initiator. Nitrogen analysis showed that the product polymer contained 1.3% by weight of N-methylol acrylamide groups. Cotton fabrics treated with this polymer in the same manner as described in Example 4 had an oil repellency of 70. After one washing the oil repellency was 70 and the spray rating was 70.

Similar results are obtained when the procedure of this example is repeated except using 98 parts of 1H,1H,9H-hexadecafluorononyl methacrylate in lieu of the corresponding acrylate.

*Example 8*

Following the procedure given in Example 4, 15 parts of 1H,1H,11H-eicosafluorohendecyl acrylate, 34 parts of 1H,1H,7H-dodecafluoroheptyl acrylate, 1 part of N-methylol acrylamide and 90 parts of boiled distilled water were emulsified using 1.75 parts sodium lauryl alcohol sulfate as an emulsifying agent and 0.5 part of sodium borate as a buffer to maintain pH at about 8. The emulsion was heated to 50° C. and a solution of 0.4 part of potassium persulfate and 0.2 part of sodium bisulfite in 18 parts of boiled distilled water was added. The mixture was heated and stirred at 50° C. for 16 hours. The mixture was cooled and filtered.

The filtrate was a latex which contained 28.2% solids and had a pH of 8.3. The polymer was isolated by pouring the latex into methanol and washing the coagulated polymer with water. This polymer was insoluble in acetone and was of essentially the same composition as that of Example 4.

A pad bath containing approximately 5% solids was made by diluting the above described latex with water. The pH of the pad bath was 7.6. Cotton padded with this dispersion (2.8% on weight of fiber) had an oil repellency of 50. After 16 wash and ironing cycles the oil repellency remained at 50.

A similar pad was prepared and the pH was adjusted to 2.4 with sulfuric acid. Cotton padded with the dispersion to obtain 3.2% of the polymer on the cotton had an oil repellency and water repellency of 80. After 14 wash and rinse cycles and ironing, the oil and water repellency remained at 80.

*Example 9*

Two parts of ammonium di(1H,1H,7H-dodecafluoroheptyl)phosphate (U.S.P. 2,597,702) and 1 part of N-methylol acrylamide were added to 100 parts of boiled distilled water, and the mixture was homogenized to enhance solution. Then, a mixture of 15 parts of 1H,1H,11H-eicosafluorohendecyl acrylate and 34 parts of 1H,1H,5H-octafluoropentyl acrylate was added with vigorous mixing. This mixture was then heated to 50° C. and 0.2 part of potassium persulfate was added as initiator. The reaction mass was held at 50° C. for 9 hours to complete the polymerization. The product was a milky emulsion free of coagulum, having a pH of 4.0 and containing 32.7% by weight of solids. When this product was padded onto cotton from a 5% by weight pad bath of pH 2.5 to give a pickup of 4.3% and then air dried and ironed, the durable oil and water repellency of the treated fabric was very good.

Essentially the same results are obtained when the ammonium salts of perfluorooctanoic acid or omega-hydroperfluorononanoic acid are used as dispersants in the above example.

When the procedure of Example 4 is followed except for using acrylamide in lieu of N-methylol acrylamide, the oil- and water-repelling effects on cotton fabric produced by the resulting latex are not fast to washing. Thus, in one experiment wherein the dry pickup on the fabric was 4.6% by weight, the initial oil and water-repelling ratings were 70, but this rating was reduced to zero after one washing. Ironing of the washed fabric failed to raise the rating above zero.

*Example 10*

98 parts of 1H,1H-pentafluoropropyl acrylate was emulsified with agitation in a solution comprising 180 parts of boiled distilled water, 4 parts of sodium lauryl alcohol sulfate, 0.49 part of sodium borate, and 0.4 part of potassium persulfate contained in a round bottom glass polymerization vessel. The emulsion was heated to 55° C. and to it was added 2 parts of N-methylolacrylamide. The mixture was kept agitated and held at a temperature between 50° and 55° C. for 20 hours. During this time a 94% conversion of the monomers to polymer occurred to provide an aqueous suspension having about 33% solids. The solids contained 0.24% nitrogen; the calculated value is 0.28% nitrogen.

The polymer, when padded onto cotton poplin by dipping the fabric into the pad bath, expressing the excess liquid, drying, and heating for 3 min. at 150° C., rendered the fabric oil- and water-repellent. The gain in weight of the fabric (i.e., dry pickup of the polymer) and the observed oil- and water-repellency were:

| Degree of Padding, Gain in Weight of Fabric, in percent | Oil Repellency Rating | | Water Spray Rating | |
|---|---|---|---|---|
| | Initial | After 3 Washings | Initial | After 3 Washings |
| 2 | 70 | 60 | 50 | 50 |
| 1 | 70 | 60 | 50 | 50 |
| 0.5 | 70 | 50 | 50 | 50 |

Similar results are obtained when 98 parts of 1H,1H-pentafluoropropyl methacrylate are used in the above example in lieu of the acrylate.

*Example 11*

The following table illustrates the preparation of terpolymers using various mixtures of a 1H,1H-polyfluoroalkyl acrylate and a 1H,1H,ωH-polyfluoroalkyl acrylate with N-methylol acrylamide, and the application of the resulting polymers to a variety of fibers.

| Composition No. | 1 | 2 | 3 |
|---|---|---|---|
| Components of the polymer (percent by weight): | | | |
| A | 88 | 49 | 10 |
| B | 10 | 49 | 88 |
| C | 2 | 2 | 2 |
| Repellency rating obtained on the following fibers: | | | |
| Cotton: | | | |
| OR | 60 | 70 | 70 |
| WR | 50 | 50 | 50 |
| Wool gabardine: | | | |
| OR | 50 | 60 | 60 |
| WR | 50 | 50 | 50 |
| Nylon: | | | |
| OR | 60 | 70 | 70 |
| WR | 50 | 50 | 50 |
| Polyester fiber: | | | |
| OR | 60 | 70 | 70 |
| WR | 50 | 50 | 50 |
| Wool worsted: | | | |
| OR | 50 | 60 | 60 |
| WR | 50 | 50 | 50 |

Definition of Symbols:
    A = 1H,1H,9H-Hexadecafluorononyl acrylate.
    B = 1H,1H-Pentafluoropropyl acrylate.
    C = N-Methylol acrylamide.
    OR = Oil repellency rating as defined above.
    WR = Water spray rating as defined above.

The three-component polymers were prepared as water dispersions. A mixture of 65 parts of water, 2.5 parts of a 50% water solution of octadecyltrimethylammonium chloride, and 10 parts of each in turn of the mixtures of three monomers shown above was stirred in a flask under a nitrogen atmosphere while heating to raise the temperature to 50° C. At this point 0.1 of a part of 2,2'-azodiisobutyramidine dihydrochloride dissolved in 10 parts of water was added to initiate the polymerization. The polymerization was allowed to proceed with agitation for six hours at 50° C. The resultant stable dispersions contained about 11% solids.

Portions of the aqueous dispersions were diluted with water to make pad baths containing 3% by weight of the polymer. The polymer was padded onto the fabrics by dipping an 8 g. swatch of the fabric into a pad bath and permitting it to pick up an equal weight of the 3% dispersion. The treated fabric was then dried in the air and heated in an air oven at 175° C. for two minutes.

When 1H,1H,2H,2H-heptafluoropentyl methacrylate is employed in place of the 1H,1H-pentafluoropropyl acrylate in the above polymer mixtures similar water- and oil-repellent effects on the various fibers are obtained.

When the procedures of Examples 2 to 11 inclusive are repeated except for replacing the N-methylol acrylamide in each example by an equal quantity of N-methylol methacrylamide, interpolymers are obtained having likewise improved wash-durability, particularly as to oil-repellency. This is illustrated additionally in the following examples:

Example 12

Three polymers were synthesized side by side from the following ingredients:

|  | I | II | III |
|---|---|---|---|
| N-methylolacrylamide |  | 2 |  |
| N-methylolmethacrylamide |  |  | 2 |
| 1H,1H,2H,2H-tridecafluorooctyl methacrylate | 98 | 98 | 98 |
| Octadecyltrimethylammonium bromide | 4 | 4 | 4 |
| Acetone | 80 | 80 | 80 |
| Water | 270 | 270 | 270 |
| 2,2'-azodibutyramidine dihydrochloride | 0.1 | 0.1 | 0.1 |

The reaction mixtures exclusive of the 2,2'-azodibutyramidine dihydrochloride catalyst were placed in polymerizers and purged with nitrogen. The charges were then heated to 60° C. Polymerization was initiated by adding the catalyst and continued for three hours. The conversion to polymer was 97% to 100% in each polymerization.

Each of the above aqueous dispersions, I, II, and III, was diluted with water to provide a pad bath containing 2% by weight of the polymer. Cotton poplin was padded with each dispersion to 100% weight pickup to provide 2% O.W.F. of the treating agent. The treated fabric was tested for its initial oil- and water-repellency and retention of these properties during laundering and dry cleaning as in the preceding examples with the results given below.

OIL-REPELLENCY RATING

| Polymer | Initial | After 1 wash | After 5 washes | After 1 dry cleaning | After 5 dry cleanings |
|---|---|---|---|---|---|
| I (control) | 100 | 0 | 0 | 90 | 80 |
| II | 100+ | 80+ | 80 | 100 | 100 |
| III | 100 | 90 | 50 | 100 | 100 |

WATER-SPRAY RATING

| Polymer | Initial | After 1 dry cleaning |
|---|---|---|
| I | 90 | 50+ |
| II | 80+ | 80 |
| III | 80 | 80 |

Example 13

Two polymers were prepared from the following ingredients taken in parts by weight.

|  | IV | V |
|---|---|---|
| Water | 222 | 240 |
| Octadecyltrimethylammonium bromide | 4 | 4 |
| Mixture of polyfluoroalkyl methacrylates [1] | 100 | 100 |
| Acetone | 80 | 80 |
| N-methylolacrylamide |  | 4 |
| 2,2'-azodibutyramide dihydrochloride | .04 | .01 |

[1] The mixture consisted of compounds of the formula $F(CF_2)_nCH_2CH_2O \cdot CO \cdot C(CH_3)=CH_2$, with n=6, 8 and 10 in the proportions f₁- 3:2:1, respectively.

The reaction mixtures exclusive of the catalyst were placed in polymerizing apparatus and purged with nitrogen to remove oxygen. The charges were then heated to 60° C. Polymerization was initiated by adding the 2,2'-azodibutyramidine dihydrochloride and continued for three hours. The conversion to polymer in each case was about 98%.

The polymers were padded onto cotton poplin at a 2% level, air dried, and cured for 2 minutes at 170° C. Oil-repellency and water spray ratings were as follows:

OIL-REPELLENCY RATING

| Polymer | Initial | After 1 wash | After 3 washes |
|---|---|---|---|
| IV | 90 | 0 |  |
| V | 100 | 90 | 80 |

WATER-SPRAY RATING

| Polymer | Initial | After 1 wash | After 3 washes |
|---|---|---|---|
| IV | 90 | 0 |  |
| V | 70+ | 50 | 50 |

The tables show that the added N-methylolacrylamide has definitely improved the durability of the oil- and water-repellency to repeated washing.

The polyfluoroalkyl esters used in Examples 12 and 13 may be prepared by the method given in Example 1 or by an alternative method which is expressed schematically as follows:

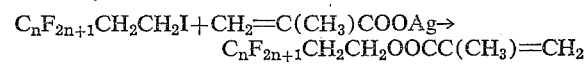

$$C_nF_{2n+1}CH_2CH_2I + CH_2=C(CH_3)COOAg \rightarrow$$
$$C_nF_{2n+1}CH_2CH_2OOCC(CH_3)=CH_2$$

The iodines $C_nF_{2n+1}CH_2CH_2I$ are prepared by reacting $C_nF_{2n+1}$ with ethylene (see Haszeldine et al., J. Chem. Soc., 1949, 2856; 1950, 3041 and Park et al., WADC 56–590, part II, ASTIA 151014; J. Org. Chem., 23, 1166 (1958)). The iodides $C_nF_{2n+1}I$ are available by the methods of Haszeldine et al. (Nature, 167, 139 (1951); J. Chem. Soc. 1953, 3761) and Brice and Simons (J.A.C.S., 73, 4016 (1951)).

It will be understood that while the specific examples above mention specifically cotton or wool fabric, the novel compositions of this invention may be applied with equal effect and for the same purpose to other textile fibers such as nylon, acrylic or polyester fibers, as well as to mixed textiles, for instance mixtures of wool with acrylic fibers. The novel compositions of this invention are further applicable to non-textile fibrous materials, such as paper, or indeed to non-fibrous industrial films for instance regenerated cellulose or cellulose ester films.

Example 14

Portions of the aqueous dispersions described in Example 11 were diluted with water, as in Example 11, to make pad baths containing 3% by weight of the polymer. Pad baths of this nature were prepared for each of the terpolymers tabulated in Example 11. Strips of untreated cellophane (regenerated cellulose) film were dipped into the respective pad baths. The dipped specimens were drip dried at room temperature and heated for two minutes at 180° C., whereupon they were found to possess high oil repellency and high water-repellency.

The measurements of these repellencies in this example were made by determination in each case of the contact angle, essentially as described by W. C. Bigelow et al. in Journal of Colloid Science, vol. 1, page 520. In our procedure, however, the advancing contact angle was measured, which means the limit which the contact angle approaches as the size of the liquid globule (oil or water) on the cellophane surface is increased by adding thereto additional droplets of the same liquid.

We found that with hexadecane as the oily liquid, the advancing contact angle in the treated cellophane reached a value varying from 64 to 73° (according to the terpolymer employed in the pad path), compared to an angle of 0° for untreated cellophane. In the case of water, the advancing contact angle for the three terpolymers varied from 104 to 112°, compared to 0° for an untreated control.

The following table gives further details on these tests:

| Composition of Polymer, Percent by Wt. | | | Oil Repellency, Contact Angle Against Hexadecane, in Degrees | Water Repellency Contact Angle Against Water, in Degrees |
|---|---|---|---|---|
| A | B | C | | |
| 88 | 10 | 2 | 64 | 104 |
| 49 | 49 | 2 | 72 | 110 |
| 10 | 88 | 2 | 73 | 112 |
| Untreated Cellophane | | | 0 | 0 |

NOTE.—The definitions of components A, B and C are as in Example 11.

In lieu of applying the oil- and water-repellent agent to fabrics by padding from an aqueous suspension, a suspension of the repellent may be sprayed onto the surface of the textile fabric or paper; the fibrous material is then dried and heated to impart durability of the agent on the material.

Other variations in the details of this invention will be readily apparent to those skilled in the art.

We claim as our invention:

1. An interpolymer of an N-methylol acrylamide compound of the formula $$Q-NH-CH_2OH$$

wherein Q represents the acyl radical of an acid of the group consisting of acrylic and methacrylic acids, with at least one fluoroalkyl ester of the group represented by the formulas $$Q-OCH_2(CF_2-CF_2)_mH \quad (m=1 \text{ to } 6)$$
$$Q-OCH_2(CF_2)_nF \quad (n=2 \text{ to } 12)$$

and $$Q-OCH_2CH_2(CF_2)_nF \quad (n=2 \text{ to } 12)$$

Q representing an acyl radical as above defined, said N-methylol acrylamide constituting not less than 0.25% and not more than 5% by weight of the interpolymer.

2. An interpolymer of an acrylamide compound of the group consisting of N-methylol acrylamide and N-methylol-methacrylamide with a fluoroalkyl ester of the formula $$CH_2=\overset{R}{\underset{|}{C}}-\overset{O}{\underset{\|}{C}}-OCH_2-(CF_2)_nF$$

wherein R is a member of the group consisting of H and $CH_3$ and $n$ is an integer from 2 to 12, the proportion of said acrylamide compound in the interpolymer being from 0.25 to 5.0% by weight.

3. An interpolymer of an acrylamide compound of the group consisting of N-methylol acrylamide and N-methylol-methacrylamide with a fluoroalkyl ester of the formula $$CH_2=\overset{R}{\underset{|}{C}}-\overset{O}{\underset{\|}{C}}-OCH_2-(CF_2-CF_2)_mH$$

wherein R is a member of the group consisting of H and $CH_3$ and $m$ is an integer from 1 to 6, the proportion of said acrylamide compound in the interpolymer being from 0.25 to 5.0% by weight.

4. An interpolymer of an acrylamide compound of the group consisting of N-methylol acrylamide and N-methylol-methacrylamide with a fluoroalkyl ester of the formula $$CH_2=\overset{R}{\underset{|}{C}}-\overset{O}{\underset{\|}{C}}-OCH_2CH_2-(CF_2)_nF$$

wherein R is a member of the group consisting of H and $CH_3$ and $n$ is an integer from 2 to 12, the proportion of said acrylamide compound in the interpolymer being from 0.25 to 5.0% by weight.

5. An interpolymer of N-methylol acrylamide and 1H,1H,2H,2H-tridecafluorooctyl methacrylate, the proportion of the former being from 0.25 to 5.0% by weight of the interpolymer.

6. An interpolymer of N-methylol acrylamide and and 1H,1H-pentadecafluorooctyl acrylate, the proportion of the former being from 0.25 to 5.0% by weight of the interpolymer.

7. An interpolymer of N-methylol acrylamide and a fluoroalkyl methacrylate mixture of the formula $$F(CF_2)_nCH_2CH_2O\cdot CO\cdot \overset{CH_3}{\underset{|}{C}}=CH_2$$

whose components have $n$-values of 6, 8 and 10 and are present in the proportions of 3:2:1, respectively, the proportion of N-methylol acrylamide in the interpolymer being from 0.25 to 5.0% by weight.

8. A composition of matter adapted for use as a water- and oil-repellency agent, said composition being an aqueous emulsion comprising as principal effective component an interpolymer of an acrylamide compound of the group consisting of N-methylol acrylamide and N-methylol-methacrylamide with a fluoroalkyl ester of the formula $$CH_2=\overset{R}{\underset{|}{C}}-\overset{O}{\underset{\|}{C}}-OCH_2CH_2-(CF_2)_nF$$

wherein R is a member of the group consisting of H and $CH_3$ and $n$ is an integer from 2 to 12, and the proportion of said acrylamide component in the interpolymer being from 0.25 to 5.0% by weight, and said interpolymer constituting from 20 to 40% by weight of said aqueous emulsion.

9. A process for treating fibrous material for the purpose of imparting to it oil- and water-repellency effects, which comprises padding said fibrous material in an aqueous bath containing about 1 to 10% by weight of a composition as defined in claim 8, expressing excess liquid from the treated material to effect a dry pickup of between about 0.5 and 10% by weight and heating the expressed material at about 100° to 150° C. for at least about 30 seconds.

10. A composition of matter adapted for use as a water- and oil-repellency agent, said composition being an aqueous emulsion of an interpolymer of an N-methylol acrylamide compound of the formula:

$$Q-NH-CH_2OH$$

wherein Q represents the acyl radical of an acid of the group consisting of acrylic and methacrylic acids, with at least one fluoroalkyl ester of the group represented by the formulas $Q-OCH_2(CF_2-CF_2)_mH$, $(m=1 \text{ to } 6)$, $Q-OCH_2(CF_2)_nF$, $(n=2 \text{ to } 12)$, and $$Q-OCH_2CH_2(CF_2)_nF$$

$(n=2 \text{ to } 12)$, Q representing an acyl radical as above defined, said N-methylol acrylamide constituting not less than 0.25% and not more than 5% by weight of the interpolymer, said interpolymer constituting from 20 to 40% by weight of said aqueous emulsion.

11. Fibrous material when impregnated by a composition of matter as defined in claim 10.

References Cited by the Examiner

UNITED STATES PATENTS

| 2,628,958 | 2/1953 | Bittles | 260—89.5 |
| 2,642,416 | 6/1953 | Ahlbrecht et al. | 260—29.6 |
| 2,680,110 | 6/1954 | Loughran et al. | 260—86.1 |

FOREIGN PATENTS 703,435   2/1954   Great Britain.

SAMUEL H. BLECH, *Primary Examiner.*

LEON J. BERCOVITZ, MURRAY TILLMAN,
*Examiners.*